United States Patent
Northam et al.

(10) Patent No.: US 11,661,805 B2
(45) Date of Patent: May 30, 2023

(54) REAL TIME FLOW RATE AND RHEOLOGY MEASUREMENT

(71) Applicant: WEATHERFORD TECHNOLOGY HOLDINGS, LLC, Houston, TX (US)

(72) Inventors: Paul R. Northam, Houston, TX (US); Pravin Sadashiv Naphade, Mumbai (IN); Kedar M. Deshpande, Katy, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 0 days.

(21) Appl. No.: 17/391,159

(22) Filed: Aug. 2, 2021

(65) Prior Publication Data
US 2023/0032537 A1  Feb. 2, 2023

(51) Int. Cl.
| | | |
|---|---|---|
| *E21B 21/08* | (2006.01) | |
| *G01F 1/88* | (2006.01) | |
| *E21B 47/10* | (2012.01) | |
| *G01N 11/04* | (2006.01) | |
| *G01F 1/84* | (2006.01) | |

(52) U.S. Cl.
CPC .............. *E21B 21/08* (2013.01); *E21B 47/10* (2013.01); *G01F 1/8409* (2013.01); *G01F 1/88* (2013.01); *G01N 11/04* (2013.01)

(58) Field of Classification Search
CPC ........ E21B 21/08; E21B 47/10; G01F 1/8409; G01F 1/88; G01N 11/04
See application file for complete search history.

(56) References Cited

U.S. PATENT DOCUMENTS

| | | | |
|---|---|---|---|
| 4,557,142 A | * | 12/1985 | Hensley ................ E21B 49/005 73/54.32 |
| 5,297,426 A | | 3/1994 | Kane et al. |
| 5,359,881 A | | 11/1994 | Kalotay et al. |
| 5,661,232 A | | 8/1997 | Van Cleve et al. |
| 7,606,636 B2 | | 10/2009 | Dykstra |
| 7,819,022 B2 | | 10/2010 | Hope |
| 9,388,650 B2 | | 7/2016 | Leuchtenberg |
| 9,518,434 B1 | * | 12/2016 | Champness ............. E21B 21/01 |

(Continued)

FOREIGN PATENT DOCUMENTS

| | | |
|---|---|---|
| EP | 0540079 A1 | 5/1993 |
| WO | 2011/151445 A2 | 12/2011 |
| WO | 2014/007797 A1 | 1/2014 |

OTHER PUBLICATIONS

International Search Report with Written Opinion dated May 2, 2022 for PCT Patent Application No. PCT/US2022/014182, 12 pages.

(Continued)

*Primary Examiner* — Brad Harcourt
(74) *Attorney, Agent, or Firm* — Smith IP Services, P.C.

(57) ABSTRACT

A flow measurement apparatus can include a main flow passage, a bypass flow passage having an inlet and an outlet connected with the main flow passage, a mass flowmeter connected in the bypass flow passage between the inlet and the outlet, and a flow restrictor connected in the bypass flow passage between the inlet and the outlet. A method can include connecting the flow measurement apparatus, so that a fluid flow in the well also flows through the flow measurement apparatus, and determining at least one rheological parameter of a non-Newtonian fluid, based on an output of the flow measurement apparatus.

14 Claims, 3 Drawing Sheets

(56) References Cited

U.S. PATENT DOCUMENTS

| | | |
|---|---|---|
| 9,995,098 B2 | 6/2018 | Brana et al. |
| 10,227,838 B2 | 3/2019 | Dillard et al. |
| 10,527,178 B2 | 1/2020 | Tuineag et al. |
| 10,598,527 B2 | 3/2020 | Dillard et al. |
| 10,712,190 B1 | 7/2020 | Parker et al. |
| 10,738,552 B1 | 8/2020 | Parker et al. |
| 10,859,415 B2 | 12/2020 | Munro |
| 2013/0133948 A1 | 5/2013 | Lovorn |
| 2014/0005957 A1 | 1/2014 | Pihlaja |
| 2015/0152700 A1 | 6/2015 | Lovorn et al. |
| 2016/0084024 A1 | 3/2016 | Dillard et al. |
| 2016/0138351 A1 | 5/2016 | Dillard et al. |
| 2016/0194927 A1 | 7/2016 | Dillard et al. |
| 2017/0328151 A1 | 11/2017 | Dillard et al. |
| 2018/0128294 A1 | 5/2018 | Sundararajan et al. |
| 2019/0106963 A1 | 4/2019 | Gray et al. |
| 2019/0234776 A1 | 8/2019 | Dillard et al. |
| 2020/0190939 A1 | 6/2020 | Gray et al. |
| 2020/0191626 A1 | 6/2020 | Lacrosse |
| 2022/0065099 A1 | 3/2022 | Johnson et al. |
| 2022/0098942 A1* | 3/2022 | Zhang .................... G01N 11/00 |

OTHER PUBLICATIONS

Kedar M Deshpande, et al.; "Multiphase Flow Modeling of Surface Equipment in Managed Pressure Drilling Operations", SPE-170654-MS, dated Oct. 27-29, 2014, 10 pages.

Office Action dated Jun. 9, 2022 for U.S. Appl. No. 17/193,149, 33 pages.

Specification for U.S. Appl. No. 17/193,149, filed Mar. 5, 2021, 27 pages.

Drawings for U.S. Appl. No. 17/193,149, filed Mar. 5, 2021, 27 pages.

* cited by examiner

REAL TIME FLOW RATE AND RHEOLOGY MEASUREMENT

BACKGROUND

This disclosure relates generally to equipment utilized and operations performed in conjunction with a subterranean well and, in examples described below, more particularly provides for measurements of flow rate and rheological parameters in real time.

In various types of well operations, it can be important to accurately measure characteristics of fluid flow through the well. For example, volumetric and mass flow rates, and rheological parameters of fluid in a well, can be useful for determining bottom hole pressures in a managed pressure drilling operation. Characteristics of fluid flow in a well are also important for operations such as well control.

Therefore, it will be appreciated that improvements are continually needed in the art of measuring parameters of fluid and fluid flow. These improvements may be useful in managed pressure drilling, well control and a variety of other types of well operations.

DETAILED DESCRIPTION

Figure 1:
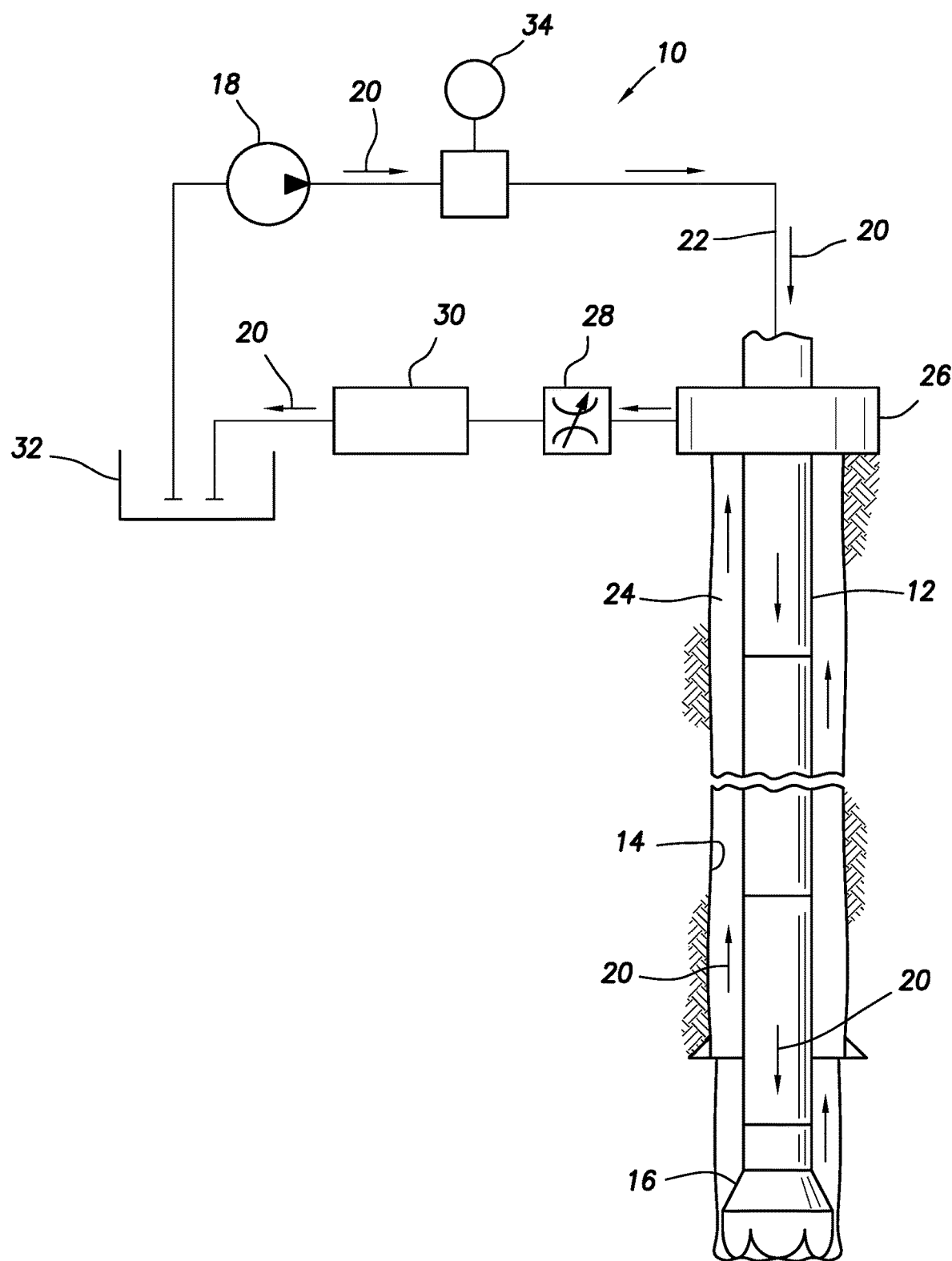
FIG. 1 is a representative partially cross-sectional view of an example of a well system and associated method which can embody principles of this disclosure.

Representatively illustrated in FIG. 1 is a system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method as described herein and/or depicted in the drawings.

In the FIG. 1 example, a tubular string 12 is positioned in a wellbore 14. The tubular string 12 is a drill string having a drill bit 16 connected at a distal end thereof for the purpose of drilling into the earth. In other examples, the tubular string 12 could be a work string, a stimulation string, a completion string, an injection string, a production string, or another type of tubular string. The scope of this disclosure is not limited to use of any particular type of tubular string in a well, or to use of a tubular string at all.

As depicted in FIG. 1, a pump 18 is used to maintain a fluid flow 20 through the tubular string 12 in the wellbore 14. In this example, the fluid flow 20 enters the tubular string 12 at the surface via a standpipe 22, which may be connected to the tubular string via a top drive, a kelly, or other equipment (not shown). The fluid flow 20 exits the tubular string 12 in the wellbore 14 via nozzles (not shown) in the drill bit 16.

The fluid flow 20 returns to the surface via an annulus 24 formed between the tubular string 12 and the wellbore 14. In managed pressure drilling operations, the annulus 24 may be isolated from the atmosphere at the surface by well equipment 26 known to those skilled in the art as a rotating control device, rotating drilling head, rotating blowout preventer, rotating control head, etc. In well control operations, the well equipment 26 may be an annular blowout preventer, pipe rams, or other equipment. However, the scope of this disclosure is not limited to use of any well equipment to isolate an annulus from the atmosphere at the surface.

The returned fluid flow 20 may pass through a choke manifold 28 and various types of fluid conditioning equipment 30 (such as, a gas separator, a shale shaker, etc.) prior to flowing into a reservoir 32 (also known as a "mud pit"). The pump 18 draws fluid from the reservoir 32. Note that the FIG. 1 example is simplified for purposes of clarity of illustration and description, and those skilled in the art will appreciate that additional equipment or different equipment may be used, depending in part on the particular well operation being performed.

In the FIG. 1 example, a flow measurement apparatus 34 is connected between the pump 18 and the tubular string 12. Thus, the fluid flow 20 exiting the pump 18 passes through the flow measurement apparatus 34 and the standpipe 22 prior to entering the tubular string 12. In this manner, characteristics of the fluid flow 20 (such as, volumetric and mass flow rate, density, other rheological parameters, etc.) can be accurately measured as it is being introduced into the well. In some examples, another flow measurement apparatus (or another type of flow measurement apparatus) may also measure characteristics of the fluid flow 20 after it exits the well (such as, a flowmeter connected downstream of the choke manifold 28).

In the FIG. 1 example, the pump 18 may be of the type known as a triplex pump or rig pump. A flow rate produced by the pump 18 can in some cases be relatively high. In particular, the flow rate can be high enough to cause excessive wear and damage to a conventional mass flowmeter of the type that is designed to be connected in a main flow line (such as, downstream of the choke manifold 28).

The flow measurement apparatus 34 in the system 10 of FIG. 1 instead uses a mass flowmeter connected in a bypass flow passage, which is connected in parallel with a main flow passage. A flow restrictor in the bypass flow passage prevents the mass flowmeter from being exposed to undesirably high flow rates. This is especially beneficial in situations where the fluid flowing through the mass flowmeter has a relatively high density.

Figure 2:
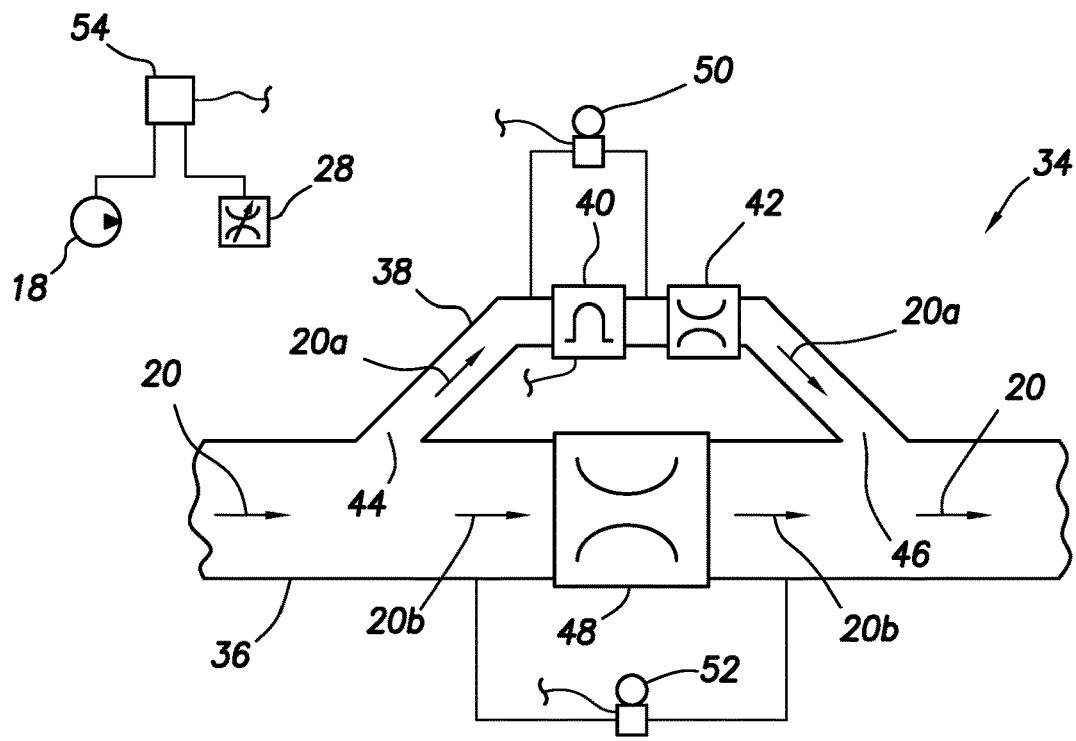
FIG. 2 is a representative schematic view of an example of a flow measurement apparatus that may be used with the FIG. 1 system and method.

Referring additionally now to FIG. 2, a schematic view of an example of the flow measurement apparatus 34 is representatively illustrated. The FIG. 2 flow measurement apparatus 34 may be used with the system 10 and method of FIG. 1, or it may be used with other systems and methods.

In the FIG. 2 example, the flow measurement apparatus 34 includes a main flow passage 36 and a bypass flow passage 38 connected in parallel with a section of the main flow passage. A mass flowmeter 40 (such as, a Coriolis flowmeter) and a flow restrictor 42 are connected in the bypass flow passage 38. Another flow restrictor 48 is connected in the main flow passage 36.

An inlet 44 of the bypass flow passage 38 is connected to the main flow passage 36 upstream of the flow restrictor 48. An outlet 46 of the bypass flow passage 38 is connected to the main flow passage 36 downstream of the flow restrictor 48. Thus, a portion 20a of the fluid flow 20 enters the bypass flow passage 38 via the inlet 44 upstream of the flow restrictor 48, flows through the mass flowmeter 40 and the flow restrictor 42, and then flows back into the main flow passage 36 via the outlet 46 downstream of the flow restrictor 48.

The flow restrictor 48 in the main flow passage 36 produces a pressure drop from the inlet 44 to the outlet 46, thereby inducing the fluid flow portion 20a to flow through the bypass passage 38. However, where the density of the fluid is relatively high, it can be desirable to restrict the flow of the portion 20a through the mass flowmeter 40, in order to mitigate unacceptable wear or damage to the mass flowmeter.

The flow restrictor 42 is selected to have sufficient restriction to the fluid flow to prevent unacceptable wear or damage to the mass flowmeter 40. It is expected that unacceptable wear or damage to the mass flowmeter 40 can be avoided in actual well operations by maintaining a ratio of the flow rate of the main fluid flow portion 20b to the flow rate of the bypass fluid flow portion 20a greater than approximately 50:1.

At low flow rates the pressure drop across the mass flowmeter 40 becomes much greater than the pressure drop across the flow restrictor 42. Thus, while the flow restrictor 42 significantly limits the flow rate of the bypass fluid flow portion 20a at relatively high flow rates, it has much less influence at relatively low flow rates. The proper sizing of the flow restrictors 42, 48 allows measurements of rheological parameters of a wider range of fluids with varying density and viscosity to be made while improving the accuracy of measurements of the flow rate of the fluid flow 20.

In some examples, the flow restrictor 42 could comprise a variable flow restrictor (such as, the variable flow restrictors described in U.S. application Ser. No. 17/193,149 filed on 5 Mar. 2021, the entire disclosure of which is incorporated herein by this reference for all purposes). If the flow rate of the fluid flow 20 in the main flow passage 36 increases, so that the flow rate of the fluid flow portion 20a through the mass flowmeter 40 would increase to an undesired level (e.g., resulting in unacceptable wear or damage to the mass flowmeter), a restriction to flow through the variable flow restrictor 42 can be increased to thereby reduce the proportion of the fluid flow 20 entering the bypass flow passage 38. Conversely, if the flow rate of the fluid flow 20 in the main flow passage 36 decreases, so that the flow rate of the fluid flow portion 20a through the mass flowmeter 40 would decrease to an undesired level (e.g., at an insufficient flow rate to produce accurate measurements), a restriction to flow through the variable flow restrictor 42 can be decreased to thereby increase the proportion of the fluid flowing through the bypass flow passage 38.

To aid in determining rheological parameters of the fluid flow 20, a differential pressure sensor 50 is connected across the mass flowmeter 40 and another differential pressure sensor 52 is connected across the flow restrictor 48. The differential pressure sensor 50 senses a difference in pressure between an upstream side of the mass flowmeter 40 and a downstream side of the mass flowmeter. The differential pressure sensor 52 senses a difference in pressure between an upstream side of the flow restrictor 48 and a downstream side of the flow restrictor.

The sensor 50 facilitates determination of viscosity at the mass flowmeter 40. The sensor 52 facilitates determination of volumetric flow rate through the flow restrictor 48.

Although each of the sensors 50, 52 is depicted in FIG. 2 as being a single sensor, in other examples multiple sensors can be used. For example, the sensor 50 could be replaced by a pressure sensor connected upstream of the mass flowmeter 40 and another separate pressure sensor connected downstream of the mass flowmeter. Thus, the scope of this disclosure is not limited to any particular number or configuration of sensors in the flow measurement apparatus 34.

In the FIG. 2 example, the sensor 50 is connected to the bypass flow passage 38 upstream and downstream of the mass flowmeter 40. In other examples, the upstream side of the sensor 50 could be connected to the main flow passage 36 upstream of the inlet 44. Similarly, the sensor 52 is connected to the main flow passage 36 upstream and downstream of the flow restrictor 48, but in other examples the upstream and/or downstream side of the sensor 52 could be connected to the bypass flow passage 38 or otherwise connected. The scope of this disclosure is not limited to any particular arrangement or connection of the various elements of the flow measurement apparatus 34.

The sensors 50, 52 can communicate pressure measurements to a control system 54 via any type of wired or wireless transmission. The control system 54 can be configured to control various aspects of a well operation. For example, in the FIG. 1 system 10 and method, the control system 54 could control operation of the pump 18 and/or the choke manifold 28 in response to outputs produced by the mass flowmeter 40 and the sensors 50, 52. The control system 54 may include mathematical models, algorithms, adaptive learning, artificial intelligence, etc., for computing or determining various types of operational information (such as, bottom hole pressure) and rheological parameters (such as, density or the Herschel Bulkley fluid model parameters To, k and n).

For non-Newtonian fluids, the Herschel Bulkley model can be used:

$$T = T_O + kx^n \quad (1)$$

where T is the shear stress, x is the shear rate, $T_O$ is the yield stress, k is the consistency index, and n is the flow index. If the Herschel Bulkley fluid model parameters $T_O$, k and n are known for a particular fluid, then shear stress T can be readily calculated and used in the other mathematical models, algorithms, adaptive learning, artificial intelligence, etc., of the control system 54 for determining operational information and controlling the well operation (such as, by adjusting the choke 28 or varying the output of the pump 18).

Pipe frictional models (such as the Darcy model) have been used in past applications to approximate the pressure drop for a given pipe geometry. However, the geometric effects of transitions, elbows, inlets and outlets of the apparatus are more difficult to approximate with a simple theoretical equation, especially when the fluid is non-Newtonian. Computational fluid dynamics (CFD) software can estimate flow across complex geometries, and determine the relationship between pressure drop and the flow rates of the bypass and main fluid flow portions 20a,b.

The calculations from the CFD software can be based on the Herschel Bulkley non-Newtonian model, where the parameters n, k, $T_O$ are defined along with density. Alternatively, any other non-Newtonian model (such as the Power Law model) could be used.

In one example, the CFD software can generate a robust data table with a wide range of the rheological parameters and densities stored, along with corresponding sets of flow rates in the main and bypass flow passages 36, 38. The data table can consist of enough iterations to allow interpolation between the stored values with a high degree of accuracy.

Figure 3:
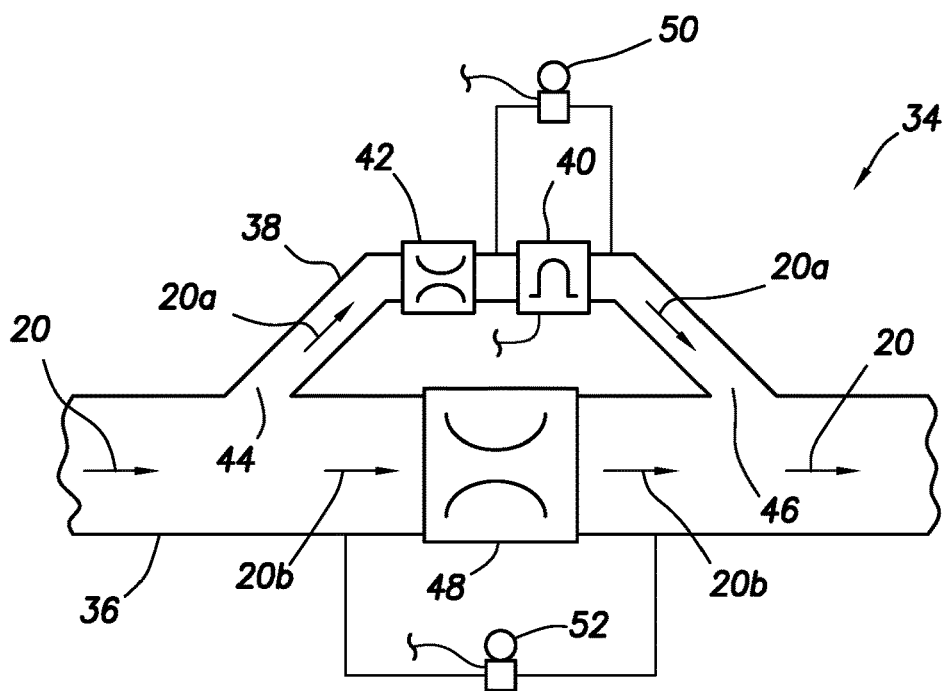
FIG. 3 is a representative schematic view of another example of the flow measurement apparatus.

Referring additionally now to FIG. 3, a schematic view of another example of the flow measurement apparatus 34 is representatively illustrated. In this example, the mass flowmeter 40 is connected downstream of the flow restrictor 42 in the bypass flow passage 38. The flow restrictor 42 is connected between the inlet 44 and the mass flowmeter 40. The mass flowmeter 40 is connected between the flow restrictor 42 and the outlet 46.

The upstream side of the sensor 50 is connected to the bypass flow passage 38 between the flow restrictor 42 and the mass flowmeter 40, and the downstream side of the sensor 50 is connected to the bypass flow passage between the mass flowmeter 40 and the outlet 46. However, the scope of this disclosure is not limited to any particular arrangement or configuration of the elements of the flow measurement apparatus 34. For example, the downstream side of the sensor 50 could be connected to the main flow passage 36 downstream of the flow restrictor 48, if desired.

Figure 4:
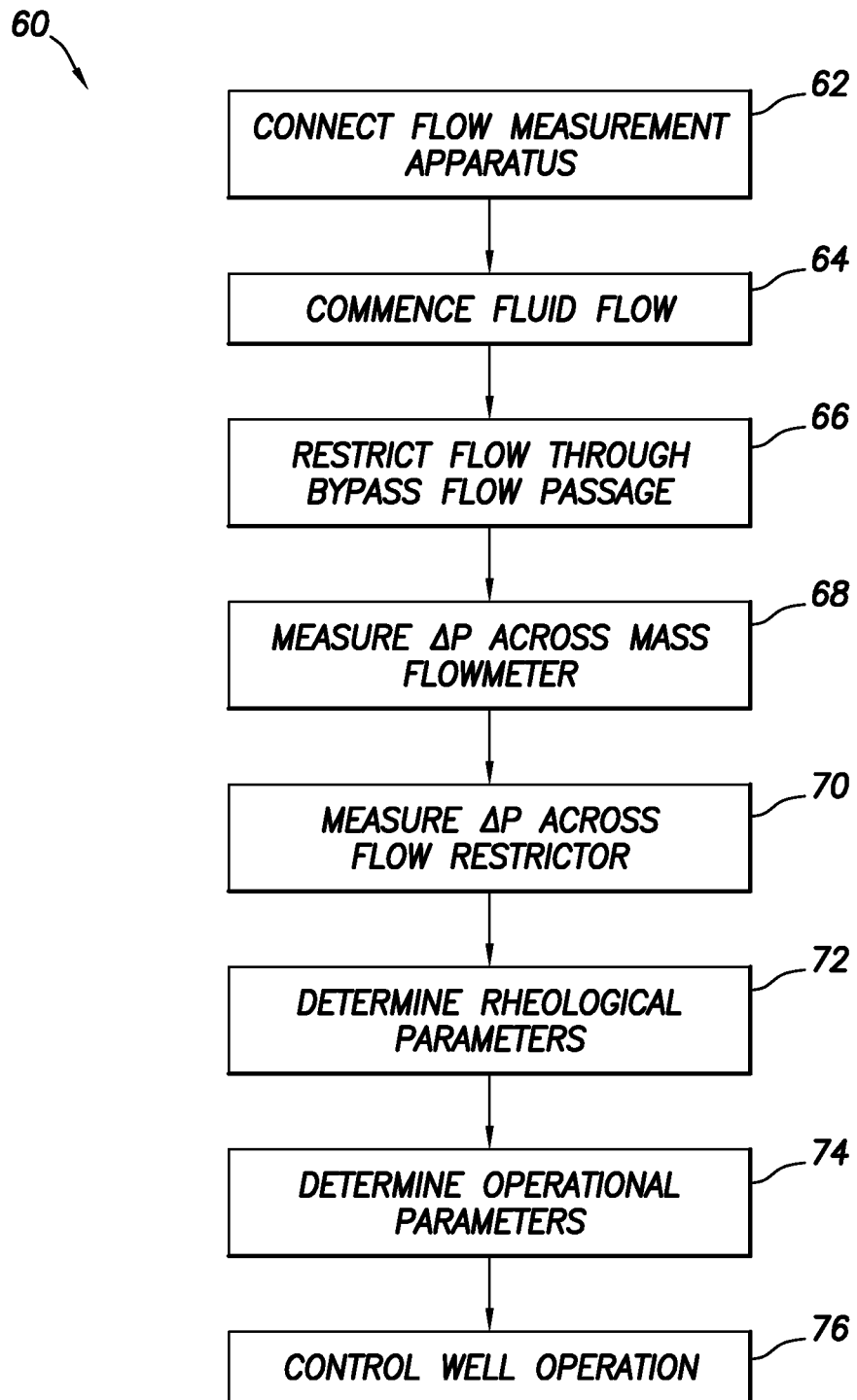
FIG. 4 is a representative flowchart for an example of the method.

Referring additionally now to FIG. 4, a flowchart for an example of a method 60 is representatively illustrated. The method 60 may be used with the system 10 of FIG. 1 or the apparatus 34 of FIG. 2 or 3, or the method 60 may be used with other systems and apparatus.

In step 62, the flow measurement apparatus 34 is connected in the system 10. In the FIG. 1 example, the flow measurement apparatus 34 is connected so that fluid that flows through the standpipe 22 into the well will also flow through the flow measurement apparatus. In other examples, the flow measurement apparatus 34 may be connected in other positions (such as, to measure parameters of fluid discharged from the well).

In step 64, the fluid flow 20 is commenced. In the FIG. 1 system 10, the pump 18 flows the fluid from the reservoir 32 to the standpipe 22 and thence through the tubular string 12 in the wellbore 14, returning to the surface via the annulus 24. The fluid flow 20 may take different paths in other examples.

In step 66, flow through the bypass flow passage 38 is restricted. In the FIGS. 2 & 3 example, the flow restrictor 42 restricts the flow of the fluid flow portion 20a through the bypass flow passage 38. This mitigates wear or damage to the mass flowmeter 40 due to relatively high flow rates and fluid densities.

In some examples, the flow restrictor 42 could comprise a variable flow restrictor, in which case the restriction to flow through the flow restrictor 42 could be controlled by the control system 54 to automatically prevent unacceptable wear or damage to the mass flowmeter 40 due to relatively high flow rates and fluid densities. The restriction to flow through the flow restrictor 42 could increase when the fluid density increases, and the restriction to flow could increase and decrease as needed to maintain the flow rate through the bypass flow passage 38 in a predetermined range for the fluid density.

In step 68, the differential pressure across the mass flowmeter 40 is measured. The measured differential pressure, along with the output of the mass flowmeter 40, facilitates determination of viscosity. The density or specific gravity of the fluid is also derived from the mass flowmeter 40 output.

In step 70, the differential pressure across the flow restrictor 48 is measured. The measured differential pressure, along with the characteristics of the flow restrictor 48, facilitates determination of volumetric flow rate of the fluid flow portion 20b. The Bernoulli equation may be used:

$$q = C_V (SG/dp)^{1/2} \quad (2)$$

where q is flow rate, $C_V$ is flow coefficient, SG is specific gravity, and dp is differential pressure.

In step 72, various rheological parameters of the fluid flow 20 are determined. The rheological parameters may be determined using the mathematical models, algorithms, adaptive learning, artificial intelligence, etc., of the control system 54, along with the measured pressure differentials output by the sensors 50, 52 and the mass flow rate output by the mass flowmeter 40.

Using the sensed pressure differentials, along with density and mass flow rate obtained from the mass flowmeter, various techniques may be used for calculating the parameters n, k, $T_O$ of the Herschel-Bulkley or Bingham Plastic model for non-Newtonian fluids. These techniques can include: 1) use a software algorithm to determine a best-fit functional relationship (such as a second order polynomial) for the measured data and the unknown parameters, 2) solve a system of three equations with three unknowns using measurements obtained at three different flow rates, or 3) use a software algorithm to determine a functional relationship between each of the unknown parameters using multiple slopes of a measured flow rate curve.

In the first technique, a software algorithm can be used to determine a best-fit functional relationship between all parameters n, k, $T_O$, SG, and the flow rates in the main and bypass flow passages 36, 38. An example of the functional relationship can be a second order polynomial:

$$\text{fluid flow 20 flow rate} = f(n,k,T_O,\text{SG,fluid flow portion 20}a \text{ flow rate}) \quad (3)$$

When n, k and $T_O$ are known values, the main flow passage 36 flow rate (fluid flow 20 flow rate) can be calculated without the need of a differential pressure measurement. In the case where the n, k and $T_O$ parameters are known before-hand, a differential pressure measurement can be used as a diagnostic tool to alert when clogging occurs in the bypass flow passage 38, or to determine when the rheological parameters n, k, $T_O$ have changed a predetermined amount or have gone beyond predetermined upper or lower thresholds.

In the second technique, whenever the three values n, k, and $T_O$ are unknown, the flow rate function (3) mentioned above can be used to solve a system of three equations at three known flow rates of the fluid flow portion 20a as follows:

$$\text{fluid flow 20 flow rate 1} = f(n,k,T_O,\text{SG,fluid flow portion 20}a \text{ flow rate 1}) \quad (4)$$

$$\text{fluid flow 20 flow rate 2} = f(n,k,T_O,\text{SG,fluid flow portion 20}a \text{ flow rate 2}) \quad (5)$$

$$\text{fluid flow 20 flow rate 3} = f(n,k,T_O,\text{SG,fluid flow portion 20}a \text{ flow rate 3}) \quad (6)$$

Since the fluid flow 20 flow rate (fluid flow 20 flow rate=fluid flow portion 20a flow rate+fluid flow portion 20b flow rate), the fluid flow portion 20a flow rate and SG are direct measurements in each of the three equations, the three unknown Herschel Bulkley parameters can be determined using a software algorithm that solves the system of three equations.

For example, in a drilling operation, the rig pump 18 output flow rate will be reduced each time a drill string 12 connection is made. The three flow rates in the above equations (4-6) can result from precise measurement of pressure drop, density and flow rate at three specific points along a flow curve while the pump 18 is slowing down. Such a technique can be realized in practice with a control algorithm and cubic spline interpolation between measured data if desired.

In the third technique, a software algorithm can be used to determine a functional relationship between each of the Herschel Bulkley parameters individually (n, k, $T_O$) and one specific bypass flow passage 38 flow rate measurement, along with corresponding slopes of the flow curve at multiple flow rates. An example of a polynomial where the measured flow rate data for the bypass flow passage 38 at a first main flow passage 36 flow rate is used along with the slope of the curve at the first main flow passage 36 flow rate, and the slope of the curve at a second main flow passage 36 flow rate would be:

$$n = f(\text{SG, fluid flow portion 20}a \text{ flow rate, slope1, slope2}) \quad (7)$$

$$k = f(\text{SG, fluid flow portion 20}a \text{ flow rate, slope1, slope2}) \quad (8)$$

$$T_O = f(\text{SG, fluid flow portion 20}a \text{ flow rate, slope1, slope2}) \quad (9)$$

The slope of the curve at multiple points could be calculated from a spline interpolation between the measured data points if needed, and the calculation could be made by an automated algorithm.

A large dataset from calculations and measurements can be collected and stored in a multi-parameter array containing the n, k, $T_O$, SG, fluid flow portion 20a flow rate and fluid flow 20 flow rate. The values of unknown parameters may be calculated for example, using a neural network. Alternative algorithmic methods for finding the unknown values include spline interpolation, moving least squares, and kriging.

The control system 54 can comprise software, programming or other instructions for determining the rheological parameters (such as the Herschel Bulkley parameters n, k, $T_O$) of non-Newtonian fluid. The control system 54 can also comprise software, programming or other instructions for utilizing the rheological parameters to determine operational parameters and in decision making for controlling a well operation.

In step 74, various operational parameters are determined. The rheological parameters may be determined using the mathematical models, algorithms, adaptive learning, artificial intelligence, etc., of the control system 54, along with various sensor measurements. Some or all of the rheological parameters determined in step 72 may be used in determining operational parameters in step 74.

In step 76, the well operation is controlled, based on the rheological and operational parameters determined in steps 72 & 74. In one example described above, a drilling operation is controlled by varying an output of the pump 18 and/or by varying a restriction to flow through the choke manifold 28. Other equipment may be controlled using the control system 54 in other examples.

It may now be fully appreciated that the above disclosure provides significant advancements to the art of measuring parameters of fluid and fluid flow. In examples described above, the flow rate of the fluid flow 20 through the main flow passage 36 is determined using the flow measurement apparatus 34. Rheological parameters can also be determined using the various outputs of the flow measurement apparatus 34.

The above disclosure provides to the art a flow measurement apparatus 34 for use with a subterranean well. In one example, the flow measurement apparatus 34 can include a main flow passage 36, a bypass flow passage 38 having an inlet 44 and an outlet 46 connected with the main flow passage 36, a mass flowmeter 40 connected in the bypass flow passage 38 between the inlet 44 and the outlet 46; and a first flow restrictor 42 connected in the bypass flow passage 38 between the inlet 44 and the outlet 46.

The flow measurement apparatus 34 may include at least one sensor 50 configured to sense differential pressure across the mass flowmeter 40. The sensor 50 may comprise a differential pressure sensor connected to upstream and downstream sides of the mass flowmeter 40.

The flow measurement apparatus 34 may include a second flow restrictor 48 connected in the main flow passage 36 between the inlet 44 and the outlet 46, and at least one sensor 52 configured to sense differential pressure across the second flow restrictor 48.

The mass flowmeter 40 may comprise a Coriolis flowmeter.

The first flow restrictor 42 may be connected between the mass flowmeter 40 and the outlet 46. As another alternative, the first flow restrictor 42 may be connected between the mass flowmeter 40 and the inlet 44. The first flow restrictor 42 may comprise a variable flow restrictor.

An output of the at least one sensor 50 may be communicated to a control system 54 configured to control a well operation. The control system 54 may comprise instructions for determining rheological parameters of non-Newtonian fluid.

Also provided to the art by the above disclosure is a method 60 for use with a subterranean well. In one example, the method 60 can comprise the steps of: connecting a flow measurement apparatus 34, so that a fluid flow 20 in the well also flows through the flow measurement apparatus 34, the flow measurement apparatus 34 comprising a main flow passage 36, a bypass flow passage 38, a first flow restrictor 42, and a mass flowmeter 40, the bypass flow passage 38 having an inlet 44 and an outlet 46 connected with the main flow passage 36, and the mass flowmeter 40 and the first flow restrictor 42 being connected in the bypass flow passage 38 between the inlet 44 and the outlet 46; and determining at least one rheological parameter of a non-Newtonian fluid, based on an output of the flow measurement apparatus 34.

The flow measurement apparatus 34 may further comprise at least one sensor 50, and the method may further comprise the at least one sensor 50 sensing differential pressure across the mass flowmeter 40.

The flow measurement apparatus 34 may further comprise a second flow restrictor 48 connected in the main flow passage 36 between the inlet 44 and the outlet 46.

The flow measurement apparatus 34 may further comprise another at least one sensor 52, and the method 60 may further comprise the second at least one sensor 52 sensing differential pressure across the second flow restrictor 48.

The method 60 may include determining a flow rate of the fluid flow 20 through the main flow passage 36, based on an output of the second at least one sensor 52.

The method 60 may include varying a restriction to flow through the first flow restrictor 42 in response to a change in the flow rate of the fluid flow 20.

The method 60 may include controlling a well operation in response to the rheological parameter determining step.

The method 60 may include measuring a pressure differential across the mass flowmeter 40.

The method 60 may include measuring a pressure differential across a second flow restrictor 48 connected in the main flow passage 36 between the inlet 44 and the outlet 46.

The method 60 may include connecting the first flow restrictor 42 between the mass flowmeter 40 and the outlet 46, or between the mass flowmeter 40 and the inlet 44.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," "upward," "downward," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A flow measurement apparatus for use with a subterranean well, the flow measurement apparatus comprising:
    a main flow passage;
    a bypass flow passage having an inlet and an outlet connected with the main flow passage;
    a mass flowmeter connected in the bypass flow passage between the inlet and the outlet;
    a first at least one sensor configured to sense differential pressure across the mass flowmeter;
    a first flow restrictor connected in the bypass flow passage between the inlet and the outlet;
    a second flow restrictor connected in the main flow passage between the inlet and the outlet; and
    a second at least one sensor configured to sense differential pressure across the second flow restrictor.

2. The flow measurement apparatus of claim 1, in which the first at least one sensor comprises a differential pressure sensor connected to upstream and downstream sides of the mass flowmeter.

3. The flow measurement apparatus of claim 1, in which the mass flowmeter comprises a Coriolis flowmeter.

4. The flow measurement apparatus of claim 1, in which the first flow restrictor is connected between the mass flowmeter and the outlet.

5. The flow measurement apparatus of claim 1, in which the first flow restrictor is connected between the mass flowmeter and the inlet.

6. The flow measurement apparatus of claim 1, in which the first flow restrictor comprises a variable flow restrictor.

7. The flow measurement apparatus of claim 1, in which an output of the first at least one sensor is communicated to a control system configured to control a well operation.

8. The flow measurement apparatus of claim 7, in which the control system comprises instructions for determining rheological parameters of non-Newtonian fluid.

9. A method for use with a subterranean well, the method comprising:
    connecting a flow measurement apparatus, so that a fluid flow in the well also flows through the flow measurement apparatus, the flow measurement apparatus comprising:
    a main flow passage,
    a bypass flow passage, the bypass flow passage having an inlet and an outlet connected with the main flow passage,
    a first flow restrictor,
    a mass flowmeter, the mass flowmeter and the first flow restrictor being connected in the bypass flow passage between the inlet and the outlet,
    a first at least one sensor, the first at least one sensor sensing differential pressure across the mass flowmeter,
    a second flow restrictor connected in the main flow passage between the inlet and the outlet, and
    a second at least one sensor, the second at least one sensor sensing differential pressure across the second flow restrictor;
    determining a flow rate of the fluid flow through the main flow passage, based on an output of the second at least one sensor; and
    determining at least one rheological parameter of a non-Newtonian fluid, based on an output of the flow measurement apparatus.

10. The method of claim 9, further comprising varying a restriction to flow through the first flow restrictor in response to a change in the flow rate of the fluid flow.

11. The method of claim 9, further comprising controlling a well operation in response to the rheological parameter determining.

12. The method of claim 9, further comprising communicating the pressure differential across the mass flowmeter to a control system.

13. The method of claim 9, further comprising communicating the pressure differential across the second flow restrictor to a control system.

14. The method of claim 9, further comprising connecting the first flow restrictor between the mass flowmeter and a selected one of the inlet and the outlet.

\* \* \* \* \*